(12) United States Patent
Tsai et al.

(10) Patent No.: US 7,993,769 B2
(45) Date of Patent: Aug. 9, 2011

(54) BATTERY MODULE FOR POWER HAND TOOL

(75) Inventors: Kim Y. C. Tsai, Taichung Hsien (TW); Cheng-I Teng, Taichung County (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 1114 days.

(21) Appl. No.: 11/802,117

(22) Filed: May 21, 2007

(65) Prior Publication Data

US 2008/0292910 A1 Nov. 27, 2008

(51) Int. Cl.
*H01M 10/50* (2006.01)
*H01M 2/02* (2006.01)
*H01M 2/10* (2006.01)
*H01M 2/12* (2006.01)

(52) U.S. Cl. ............ 429/82; 429/83; 429/120; 429/123; 429/159; 320/112

(58) Field of Classification Search .................. None
See application file for complete search history.

(56) References Cited

U.S. PATENT DOCUMENTS

2003/0027037 A1* 2/2003 Moores et al. .................. 429/82

* cited by examiner

*Primary Examiner* — Jonathan Crepeau
(74) *Attorney, Agent, or Firm* — Bacon & Thomas, PLLC

(57) ABSTRACT

A battery module includes a top cover and a bottom cover affixed together to accommodate a battery set, which has a conducting terminal device exposed out of the bottom cover for the connection of an external electronic device, and a movable member supported on the top surface of the bottom cover and held in a first position by spring members to block the through holes of the bottom cover and movable from the first position to a second position to open the through holes of the bottom cover for ventilation to dissipate heat when the battery module is connected to an external electronic device.

3 Claims, 5 Drawing Sheets

BATTERY MODULE FOR POWER HAND TOOL

BACKGROUND OF THE INVENTION

1. Field of the Invention

The present invention relates generally to accessories for power hand tools, and more particularly to a battery module for a power hand tool.

2. Description of the Related Art

When charging the battery of a power hand tool, electric energy is continuously transmitting to the battery and a big amount of heat energy is produced to increase the temperature of the battery. There are battery chargers that have heat dissipation means to dissipate heat when charging a battery. However, the heat dissipation means simply dissipates heat from the battery charger, having no significant effect in lowering the temperature of the battery, and the battery under charging may burn out due to excessively high temperature. The high temperature of the battery during its charging mode will also shorten the service life of the battery.

SUMMARY OF THE INVENTION

The present invention has been accomplished under the circumstances in view. It is therefore one objective of the present invention to provide a battery module, which obtains a better heat dissipation effect, preventing overheat when the battery module is being charged.

To achieve this objective of the present invention, the battery module comprises a top cover, a bottom cover, battery set and a shutter. The top cover has an accommodation chamber and an opening in communication with the accommodation chamber. The battery set is accommodated in the accommodation chamber and provided with a conducting terminal device for connection to an external electronic device. The bottom cover has a top surface covering the opening of the top cover, a bottom surface provided with at least one mounting block for coupling to an external electronic device, and a through hole and a sliding slot through the top surface and the bottom surface. The shutter has a movable member and a spring member. The moveable member has a through hole and a guide block inserted into the sliding slot of the bottom cover such that the moveable member is movable along the sliding slot between a first position where the through hole of the moveable member is offset from the through hole of the bottom cover and a second position where the through hole of the moveable member is in alignment with the through hole of the bottom cover for ventilation. The spring member is connected between the movable member and the bottom cover to support the movable member in the first position normally.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
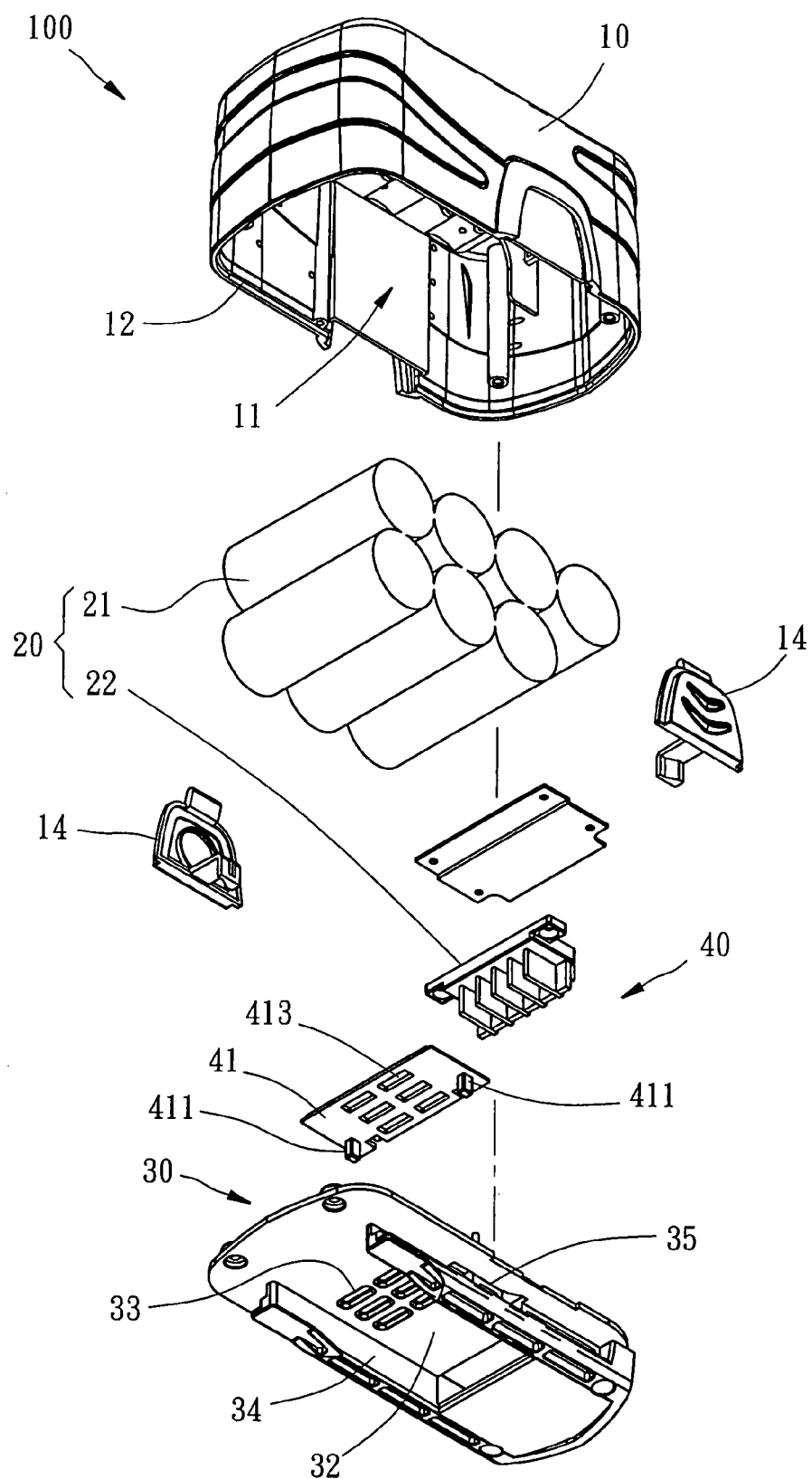
FIG. 1 is an exploded view of a battery module in accordance with a preferred embodiment of the present invention.

As shown in FIGS. 1-7, a battery module 100 in accordance with a preferred embodiment of the present invention comprises a top cover 10, a battery set 20, a bottom cover 30, and a shutter 40.

The top cover 10 has an accommodation chamber 11, an opening 12 formed on one side, namely the bottom side, in communication with the accommodation chamber 11, a plurality of through holes 13 formed on the opposite side, namely the top side, in communication with the accommodation chamber 11, and two elastic retaining members 14 symmetrically disposed at two opposite lateral sides for fastening to a battery charger or power hand tool.

The battery set 20 includes a plurality of energy storage capacitors 21, and a conducting terminal device 22. The energy storage capacitors 21 are adapted to store electric energy. The conducting terminal device 22 is electrically connected to the energy storage capacitors 21 for the connection of a battery charger or power hand tool electrically to transmit electric energy from the battery charger to the energy storage capacitors 21 or to transmit electric energy from the energy storage capacitors 21 to the power hand tool.

The bottom cover 30 has a top surface 31 and a bottom surface 32. The top surface 31 is closed on the opening 12 of the top cover 10 to close the accommodation chamber 11. The bottom cover 30 further has a plurality of through holes 33 cut through the top surface 31 and the bottom surface 32, two mounting blocks 34 protruding from the bottom surface 32 for fastening to a battery charger or power hand tool, and two sliding slots 35 cut through the top surface 31 and the bottom surface 32. Further, the conducting terminal device 22 of the battery set 20 extends to the outside of the bottom cover 30 for the connection of a battery charger or power hand tool electrically.

The shutter 40 includes a movable member 41 and two spring members 42. The movable member 41 has two guide blocks 411 protruding from its bottom surface, two protruding rods 412 extending from its one lateral side, and a plurality of through holes 413 cut through its top and bottom surfaces. The movable member 41 is closely attached with its bottom surface to the top surface 31 of the bottom cover 30, and the two guide blocks 411 of the movable member 41 are respectively inserted through the two sliding slots 35 of the bottom cover 30 and extend out of the bottom surface 32 of the bottom cover 30. The movable member 41 is movable by an external force along the sliding slots 35 between a first position and a second position. The spring members 42 each have one end respectively stopped against the bottom cover 30 and the other end respectively connected to the protruding rods 412. Normally, the spring members 42 support the movable member 41 in the first position.

After introduction of the component parts of the battery module 100, the assembly procedure and features of the battery module 100 are outlined hereinafter.

Figure 2:
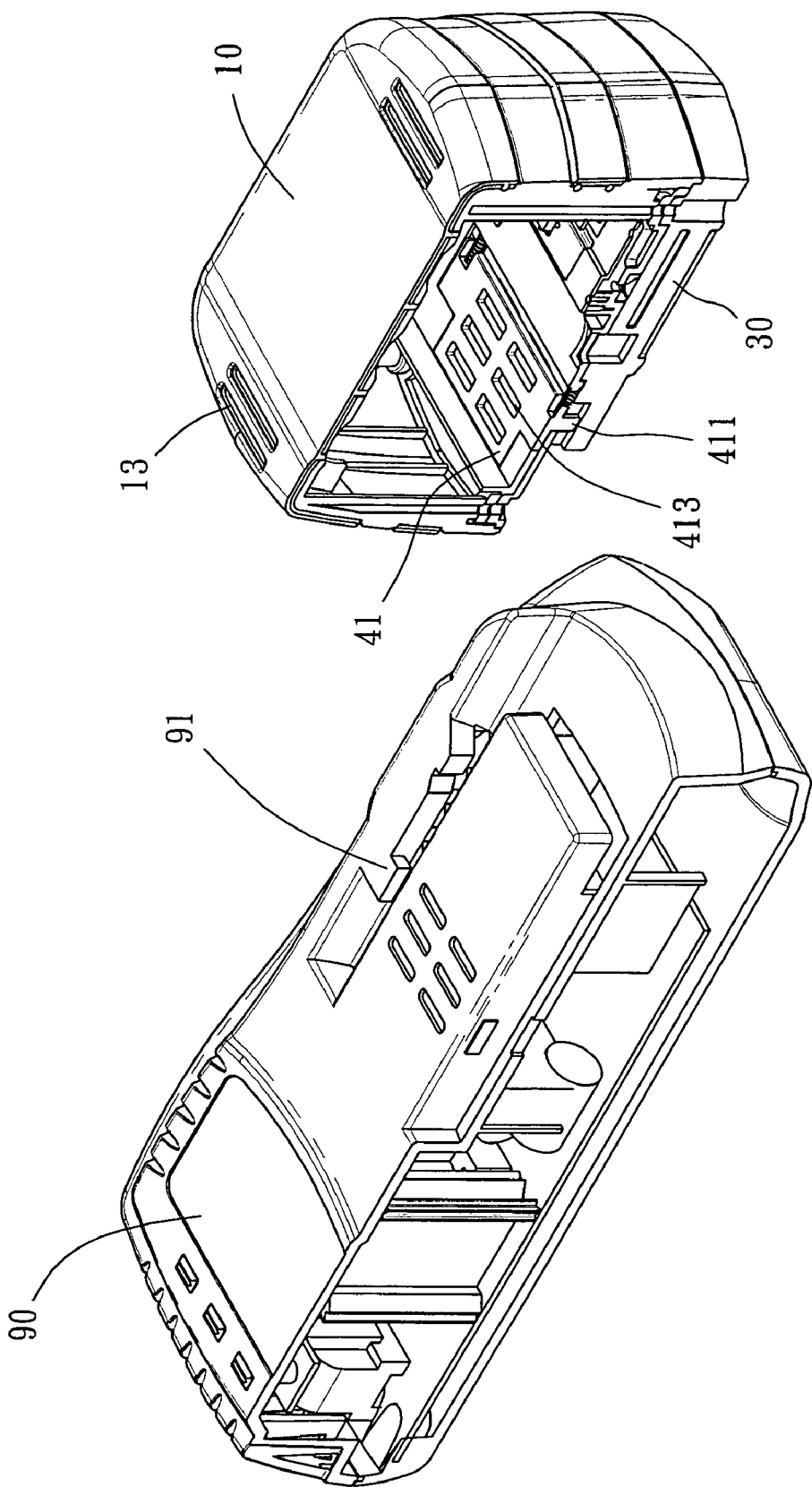
FIG. 2 shows the battery module of the present invention before connection to a battery charger.
Figure 3:
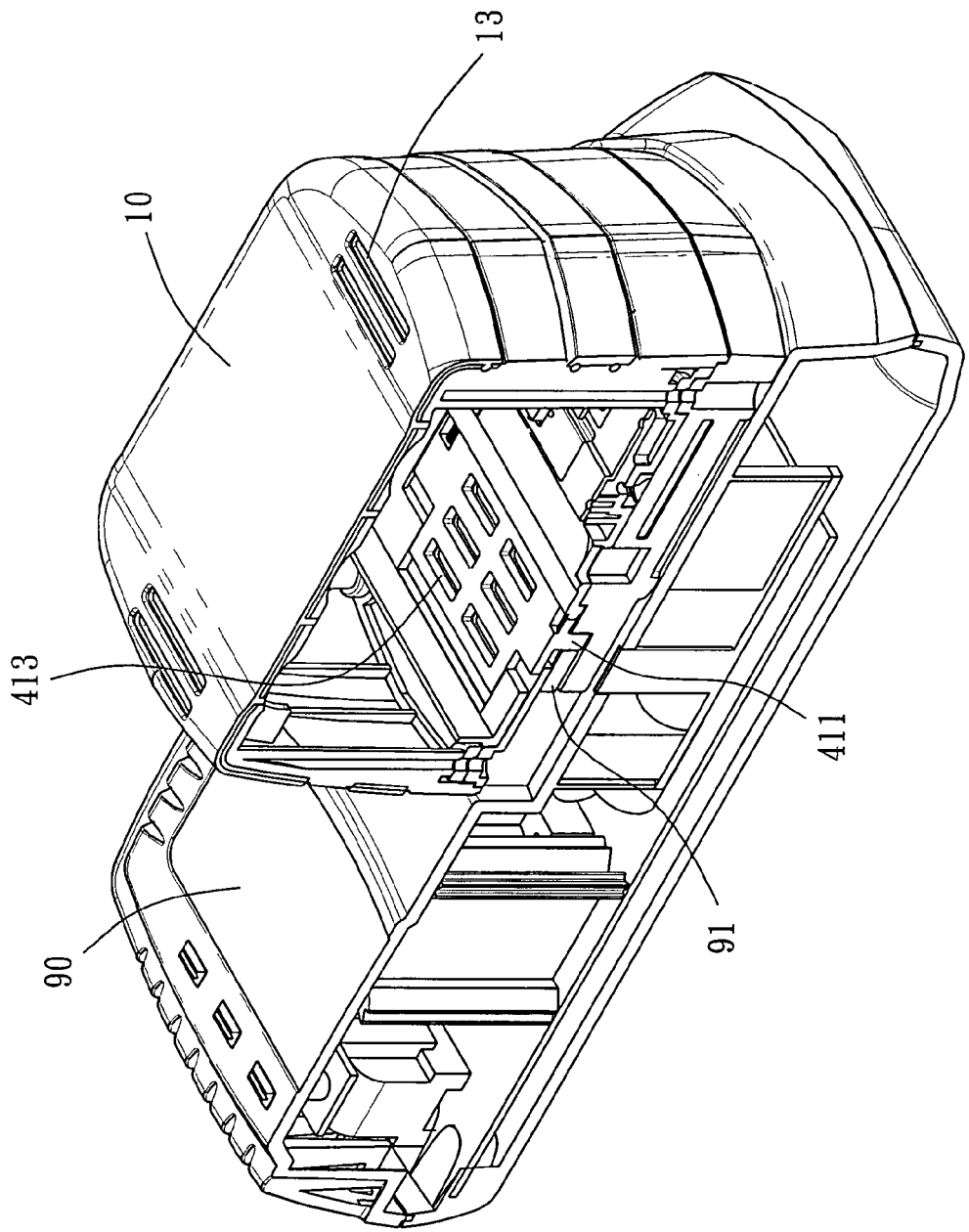
FIG. 3 corresponds to FIG. 2, showing that the battery module is attached to the battery charger.
Figure 4:
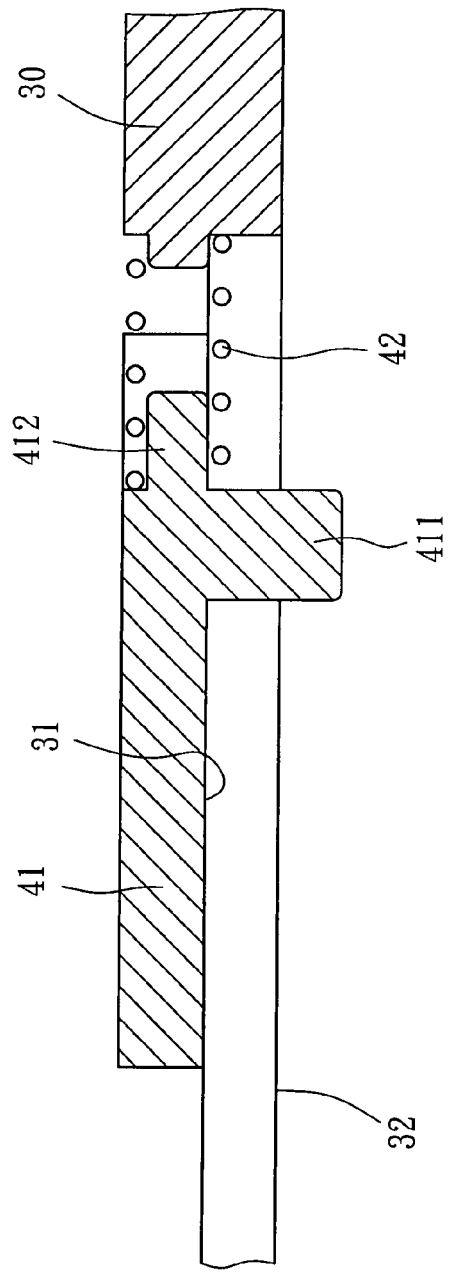
FIG. 4 is a sectional view in an enlarged scale of a part of the battery module of the present invention, showing that the movable member is supported on the bottom cover in the first position.
Figure 5:
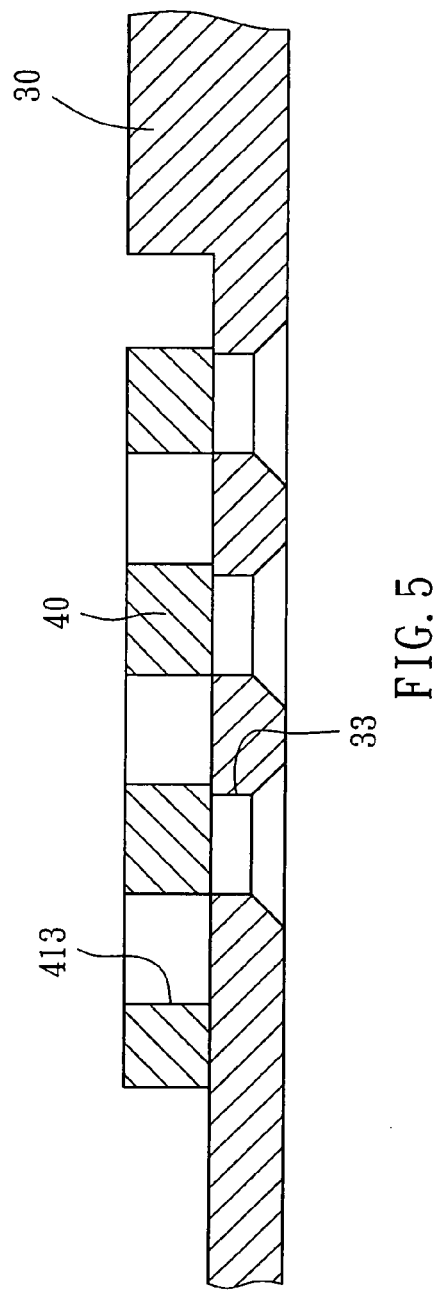
FIG. 5 is a sectional view in an enlarged scale of a part of the battery module of the present invention, showing that the through holes of the movable member are offset from the through holes of the bottom cover.
Figure 6:
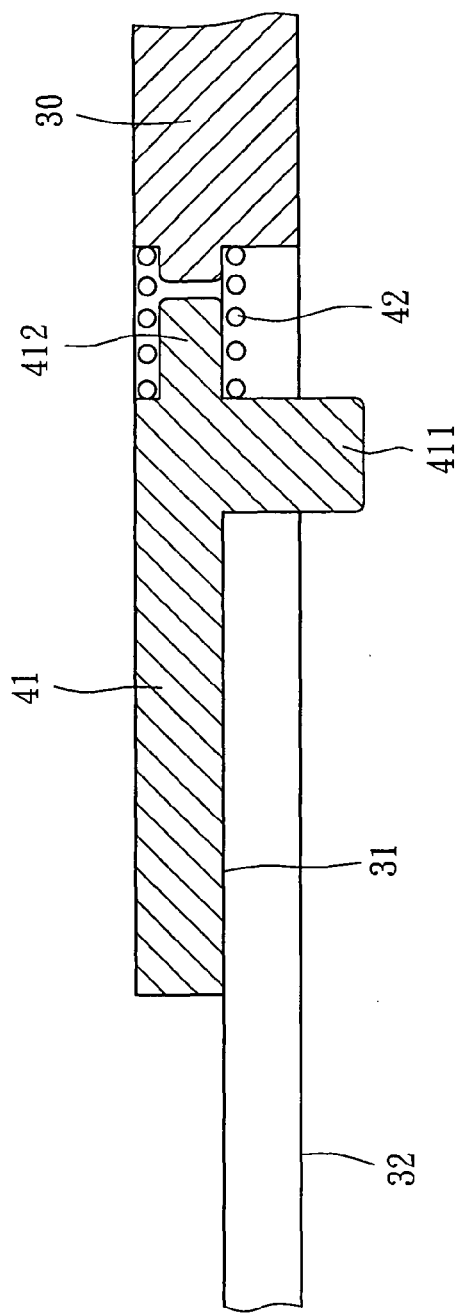
FIG. 6 is similar to FIG. 4 but showing that the movable member is moved to the second position.
Figure 7:
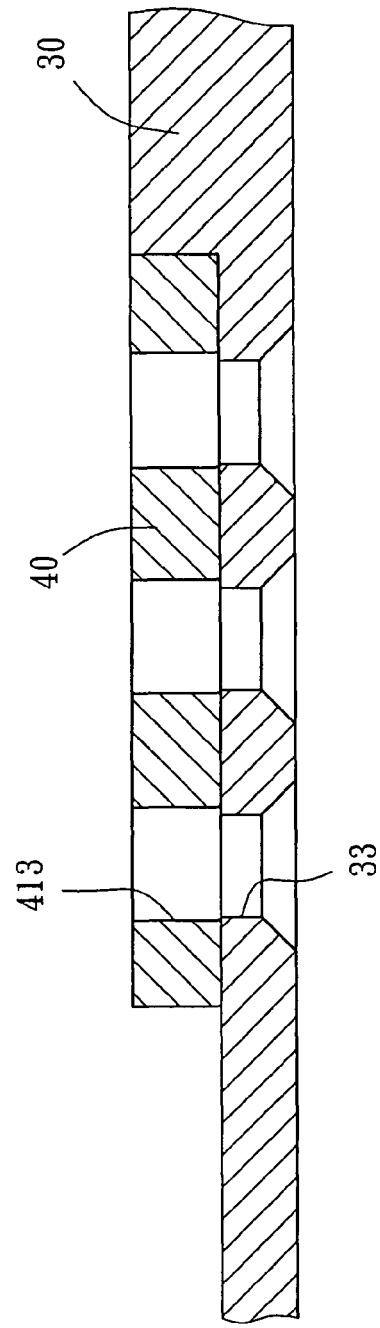
FIG. 7 is similar to FIG. 5 but showing that the through holes of the movable member are in alignment with the through holes of the bottom cover.

As shown in FIGS. 2, 4 and 5, the spring members 42 support the movable member 41 in the first position where the through holes 413 of the movable member 41 are offset from the through holes 33 of the bottom cover 30.

When the battery module 100 is charged by a battery charger 90, the two mounting blocks 34 of the battery module 100 are inserted into respective insertion holes (not shown) of the battery charger 90. At this moment, the two guide blocks 411 of the movable member 41 are stopped at a respective stop block 91 of the battery charger 90, such that the movable member 41 is forced by the stop blocks 91 of the battery charger 90 against the spring members 42 and moved from the first position to the second position where the through holes 413 of the movable member 41 are kept in alignment with the through holes 33 of the bottom cover 30 respectively (see FIGS. 3, 6 and 7).

During charging of the battery module 100 with the battery charger 90, the through holes 413 of the movable member 411 are in communication with the through holes 33 of the bottom cover 30 for ventilation so that thermal energy can be carried out of the battery set 20 to the outside of the battery module 100 to lower the temperature of the battery set 20. At the same time, external cooling air is allowed to pass through the through holes 13 of the top cover 10 into the accommodation chamber 11 to lower the temperature of the battery set 20, preventing potential damage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery module comprising:
   a top cover having an accommodation chamber and an opening in communication with the accommodation chamber;
   a battery set accommodated in the accommodation chamber, the battery set having a conducting terminal device for connection to an external electronic device;
   a bottom cover having a top surface covering the opening of the top cover, a bottom surface provided with at least one mounting block for coupling to an external electronic device, and a through hole and a sliding slot through the top surface and the bottom surface;
   a shutter having a movable member with a through hole and a guide block protruding from a bottom surface of said movable member, the guide block inserted into the sliding slot of the bottom cover and has a part thereof extending out of the bottom surface of the bottom cover such that the moveable member is movable along the sliding slot between a first position where the through hole of the moveable member is offset from the through hole of the bottom cover and a second position where the through hole of the moveable member is in alignment with the through hole of the bottom cover, and a spring member connected between the movable member and the bottom cover to support the movable member in the first position, the movable member has a protruding rod disposed at one side thereof for supporting the spring member.

2. The battery module as claimed in claim 1, wherein the top cover comprises a plurality of through holes cut through a top side thereof in communication between the accommodation chamber and the space outside the top cover.

3. The battery module as claimed in claim 1, wherein the battery set comprises a plurality of energy storage capacitors and said conducting terminal device; wherein the conducting terminal device is electrically connected to the energy storage capacitors and extending partially outside the bottom cover for the connection to an external electronic device electrically.

\* \* \* \* \*